United States Patent
Negi et al.

(10) Patent No.: US 8,761,420 B2
(45) Date of Patent: Jun. 24, 2014

(54) IMAGE PROCESSING APPARATUS AND METHOD AND A RECORDING MEDIUM

(75) Inventors: Daisuke Negi, Tokyo (JP); Hiroshige Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 12/405,345

(22) Filed: Mar. 17, 2009

(65) Prior Publication Data

US 2009/0262243 A1 Oct. 22, 2009

(30) Foreign Application Priority Data

Mar. 18, 2008 (JP) ................ P2008-068849

(51) Int. Cl.
- *H04R 5/02* (2006.01)
- *H04N 5/445* (2011.01)
- *H04N 9/74* (2006.01)
- *H04N 5/60* (2006.01)

(52) U.S. Cl.
USPC .......... 381/306; 381/310; 348/564; 348/588; 348/738

(58) Field of Classification Search
USPC ......... 381/306, 1, 2, 17, 18, 307, 310, 82, 85, 381/74; 348/564, 565, 588, 731, 734, 738; 715/727
See application file for complete search history.

(56) References Cited

U.S. PATENT DOCUMENTS

| | | | | |
|---|---|---|---|---|
| 5,548,346 A * | 8/1996 | Mimura et al. | ............... | 348/738 |
| 6,040,831 A * | 3/2000 | Nishida | .......... | 715/727 |
| 6,590,618 B1 * | 7/2003 | Park et al. | ............. | 348/734 |
| 8,130,824 B2 * | 3/2012 | Okada et al. | ........... | 375/240.01 |
| 2006/0193484 A1 * | 8/2006 | Portnykh et al. | ............. | 381/306 |
| 2007/0245391 A1 * | 10/2007 | Pont | ............ | 725/113 |
| 2008/0024666 A1 * | 1/2008 | Sudo et al. | ............. | 348/565 |
| 2008/0278628 A1 * | 11/2008 | Hirata et al. | ............. | 348/564 |
| 2010/0165200 A1 * | 7/2010 | Kataoka et al. | ............. | 348/564 |

FOREIGN PATENT DOCUMENTS

| | | |
|---|---|---|
| EP | 1 073 270 | 1/2001 |
| JP | 59-187300 | 12/1984 |
| JP | 6-311448 | 11/1994 |
| JP | 08-051580 | 2/1996 |
| JP | 08-087397 | 4/1996 |
| JP | 09-083897 | 3/1997 |
| JP | 09-307833 | 11/1997 |
| JP | 10-262300 | 9/1998 |
| JP | 11-234587 | 8/1999 |
| JP | 2000-069391 | 3/2000 |

(Continued)

OTHER PUBLICATIONS

Notification of Reasons for Refusal dated Jan. 25, 2010, with English language translation from Japanese Patent Office in corresponding Japanese Patent application No. 2008-068849.

(Continued)

*Primary Examiner* — Vivian Chin
*Assistant Examiner* — David Ton
(74) *Attorney, Agent, or Firm* — Finnegan, Henderson, Farabow & Garrett & Dunner, L.L.P.

(57) ABSTRACT

An image processing apparatus includes a generating unit configured to generate image signals for displaying content on each of a plurality of screens; and a synthesizing unit configured to synthesize a plurality of sound signals corresponding to the plurality of image signals to cause positions where sounds based on the plurality of sound signals are localized to vary from each other.

11 Claims, 20 Drawing Sheets

(56) References Cited

FOREIGN PATENT DOCUMENTS

| | | | |
|---|---|---|---|
| JP | 2000069391 A | * | 3/2000 |
| JP | 2005-117369 | | 4/2005 |
| JP | 2006-27042 | | 2/2006 |
| JP | 2006-295428 | | 10/2006 |
| JP | 2007-150890 | | 6/2007 |
| JP | 2007150890 A | * | 6/2007 |
| JP | 2008-28936 | | 7/2008 |
| WO | WO 2007/095994 | | 8/2007 |

OTHER PUBLICATIONS

Office Action from the European Patent Office, dated Jun. 12, 2009.

* cited by examiner

IMAGE PROCESSING APPARATUS AND METHOD AND A RECORDING MEDIUM

CROSS REFERENCES TO RELATED APPLICATIONS

The present invention contains subject matter related to Japanese Patent Application JP 2008-068849 filed in the Japanese Patent Office on Mar. 18, 2008, the entire contents of which being incorporated herein by reference.

BACKGROUND OF THE INVENTION

1. Field of the Invention

The present invention relates to an image processing apparatus and method and a recording medium, and particularly to an image processing apparatus and method and a recording medium in which the contents of content can be quickly identified.

2. Description of the Related Art

Recently, the size of a display to display an image of television broadcasting is increased, and even if plural screens are displayed on one display, the user can sufficiently enjoy images of the respective screens. However, with respect to sound, in most cases, only the stereo sound of one selected screen can be heard.

Then, in a commonly-owned earlier patent application, a technique is proposed in which when two screens are displayed on one display, the monaural sound of a left screen and the monaural sound of a right screen are respectively outputted from right and left speakers, and the balance of volumes of the two monaural sounds is adjusted when necessary (for example, JP-A-9-307833).

SUMMARY OF THE INVENTION

However, in order to adjust the balance, a special operation for that purpose is required. Besides, after the balance is adjusted to one side and the sound is confirmed, when the other sound is confirmed, the balance must be operated in the opposite direction. As a result, it is difficult for the user to quickly identify the contents of the sound as content.

In view of the above circumstances, it is desirable to quickly identify the contents of content.

According to an embodiment of the present invention, there is provided an image processing apparatus including a generating unit configured to generate image signals for displaying content on each of plural screens, and a synthesizing unit configured to synthesize plural sound signals corresponding to the plural image signals to cause positions where sounds based on the sound signals are localized to vary from each other.

When a first screen and a second screen of the plural screens are displayed in equal sizes, a first position where a sound based on a first sound signal corresponding to the first screen is localized and a second position where a sound based on a second sound signal corresponding to the second screen is localized can be respectively displaced in a direction toward the first screen and a direction toward the second screen with reference to a line spaced by an equal distance from the first screen and the second screen.

The localized positions can be changed in accordance with cooperative scaling of the first screen and the second screen.

When the first screen and the second screen are different in size, a sound of a larger one of the screens can be localized at a position closer to the line.

When one of the first screen and the second screen becomes maximum in size, the sound of the maximum screen can be localized on the line.

When the first screen displays an image corresponding to a thumbnail image selected from plural thumbnail images displayed on the second screen, and when the thumbnail image corresponding to the image of the first screen is focused on the second screen, the sound of the first screen is localized on the line, and when the thumbnail image different from the image of the first screen is focused on the second screen, the localized position can be changed in accordance with the cooperative scaling of the first screen and the second screen.

When the first screen displays an image corresponding to a thumbnail image selected from plural thumbnail images displayed on the second screen, and when the image of the first screen is focused, the sound of the first screen can be localized on the line.

The position where the sound of each of the first screen and the second screen is localized can be displayed.

The volume of the sound of each of the first screen and the second screen can be displayed.

According to another embodiment of the present invention, there is provided an image processing method of an image processing apparatus including the steps of: generating image signals for displaying content on each of plural screens; and synthesizing plural sound signals corresponding to the plural image signals to cause positions where sounds based on the sound signals are localized to vary from each other.

According to still another embodiment of the present invention, there is provided a program causing a computer to execute processes of: generating image signals for displaying content on each of plural screens; and synthesizing plural sound signals corresponding to the plural image signals to cause positions where sounds based on the sound signals are localized to vary from each other.

According to still another embodiment of the present invention, there is provided a recording medium recorded with a program for causing a computer to execute processes of: generating image signals for displaying content on each of plural screens; and synthesizing plural sound signals corresponding to the plural image signals to cause positions where sounds based on the sound signals are localized to vary from each other.

According to some embodiments of the present invention, a generating unit configured to generate image signals for displaying content on each of plural screens, and a synthesizing unit configured to synthesize plural sound signals corresponding to the plural image signals to cause positions where sounds based on the sound signals are localized to vary from each other can be provided.

As state above, according to the embodiments of the present invention, the contents of content can be quickly identified.

DESCRIPTION OF THE PREFERRED EMBODIMENTS

Hereinafter, embodiments of the present invention will be described with reference to the drawings.

Figure 1:
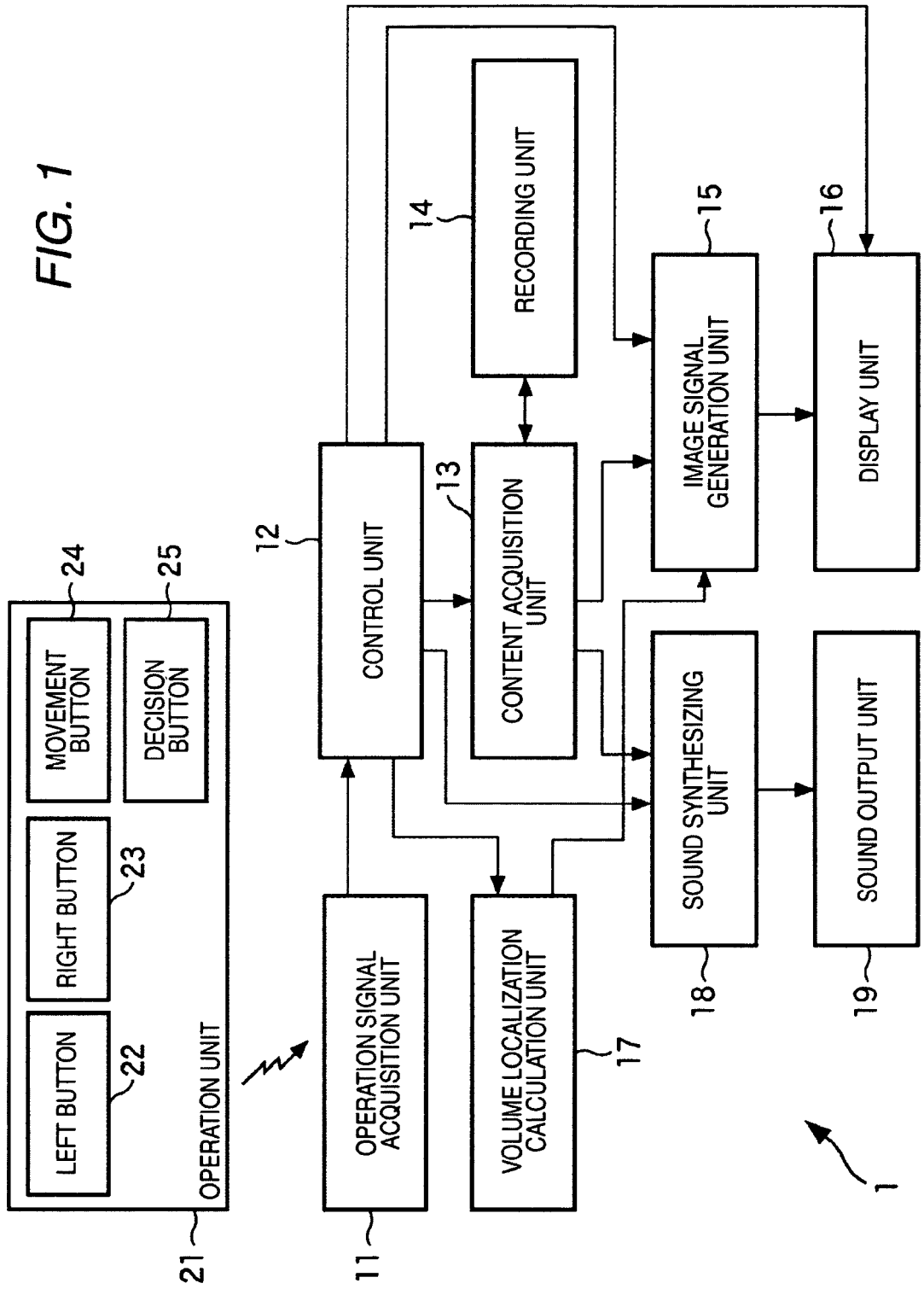
FIG. 1 is a block diagram showing a structure of an image processing apparatus of an embodiment of the invention.

FIG. 1 shows a structure of an image processing apparatus of an embodiment of the invention. This image processing apparatus 1 performs a specified process based on an operation signal from an operation unit 21 operated by a user, and displays an image of content on a display unit 16. The operation unit 21 includes, for example, a remote controller, and has a left button 22, a right button 23, a movement button 24, a decision button 25 and other buttons (not shown). Of course, the operation unit 21 may include various buttons, switches and the like attached to a main body of the image processing apparatus 1.

The image processing apparatus 1 includes an operation signal acquisition unit 11, a control unit 12, a content acquisition unit 13, a recording unit 14, an image signal generation unit 15, a display unit 16, a volume localization calculation unit 17, a sound synthesizing unit 18, and a sound output unit 19. Among these, the recording unit 14, the display unit 16 and the sound output unit 19 can be provided independently of the main body of the image processing apparatus 1.

The operation signal acquisition unit 11 acquires an operation signal from the user, which is supplied from the operation unit 21 operated by the user. The acquired operation signal is supplied to the control unit 12. The control unit 12 controls the operation of the respective units based on the operation signal.

The content acquisition unit 13 incorporates plural tuners, and has a function to independently and simultaneously receive image signals of different channels from broadcast signals transmitted through satellite broadcast, communication satellite or cable. The content acquisition unit 13 simultaneously and independently decodes the image signals received by the tuners, and outputs them to the image signal generation unit 15. In the case of this embodiment, the image signals of nine channels in total can be simultaneously acquired. Of course, the number is arbitrary, and no limitation is made to nine.

Besides, the content acquisition unit 13 encodes the image signals recorded in the recording unit 14, decodes the image signals reproduced by the recording unit 14, and outputs them to the image signal generation unit 15.

Further, the content acquisition unit 13 has a function to simultaneously receive plural different image signals through various networks typified by the Internet.

The recording unit 14 includes a hard disk, an optical disk, an magneto-optical disk, or a solid-state memory, and records image signals acquired and encoded by the content acquisition unit 13. The recording unit 14 also stores a computer program as required.

The image signal generation unit 15 generates image signals for displaying plural screens on the display unit 16. Specifically, image signals of two screens of a main display area and a sub display area (the display area will be described later with reference to FIG. 3) are generated. The image signal generation unit 15 scales each of the image signals, as image signals of the sub display area, of the nine channels supplied from the content acquisition unit 13, generates image signals of thumbnail images of moving pictures, and causes the image signal of a selected area of the sub display areas to become the image signal of the main display area. The image signal generation unit 15 outputs the generated image signals to the display unit 16 and causes the corresponding images to be displayed.

The display unit 16 includes an LCD (Liquid Crystal Display), a CRT (Cathode Ray Tube), an organic EL (Electroluminescence) display, or a plasma display, and displays plural screens on one display surface.

The volume localization calculation unit 17 calculates the volume and localized position of the sound of the screen of the main display area and those of the sound of the screen of the sub display area. The sound synthesizing unit 18 adjusts the levels and phases of the sound signals supplied from the content acquisition unit 13 and synthesizes them, so that the sound of the volume calculated by the volume localization calculation unit 17 is localized at the calculated position.

The sound output unit 19 including a speaker and the like is disposed at each of both the right and left ends of the display unit 16 and outputs the sound corresponding to the sound signal supplied from the sound synthesizing unit 18.

Figure 2:
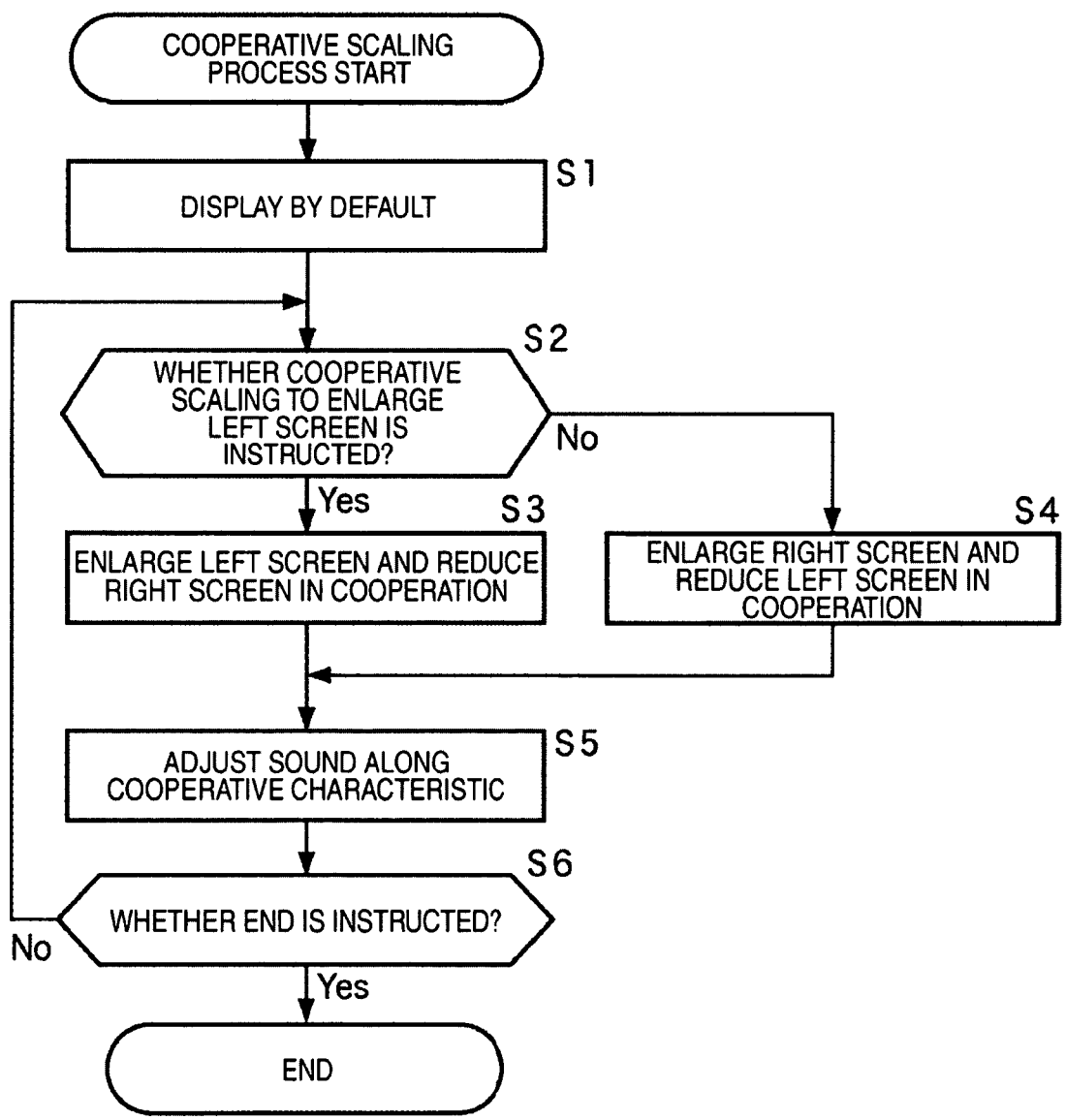
FIG. 2 is a flowchart for explaining a cooperative scaling process.

Next, a cooperative scaling process performed by the image processing apparatus 1 will be described with reference to a flowchart of FIG. 2. This process is started when an image display is instructed.

Figure 3:
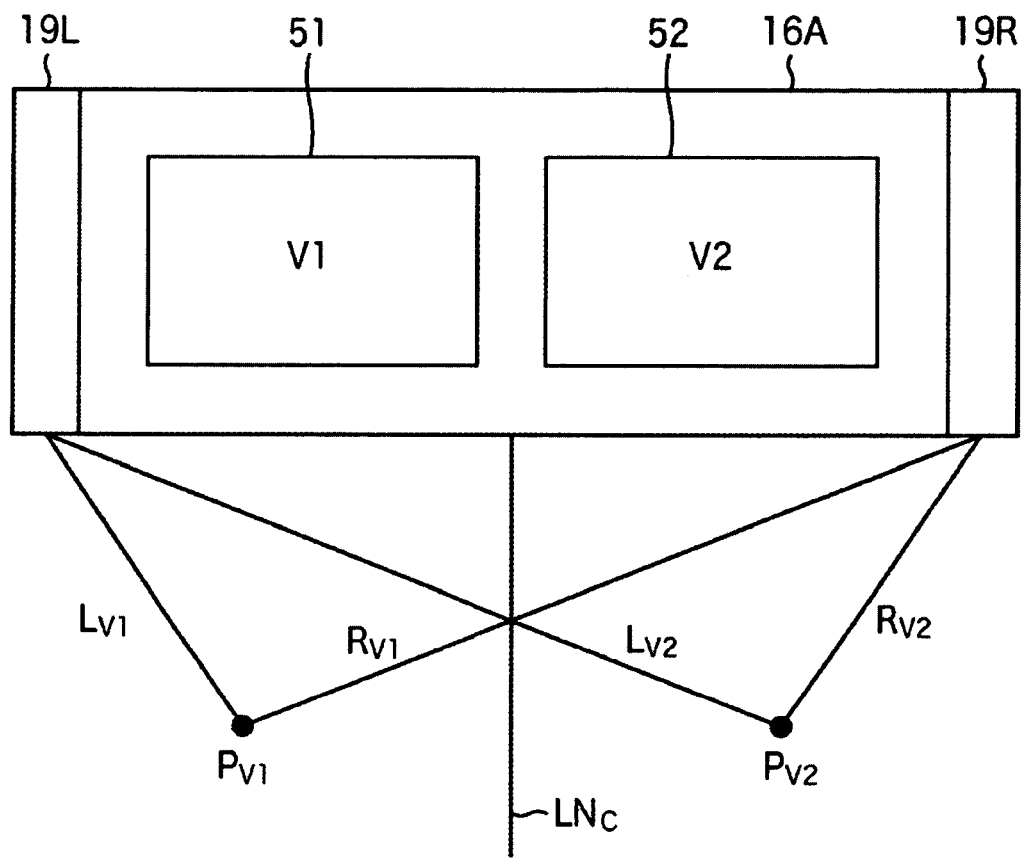
FIG. 3 is a view showing state where sizes of right and left screens at cooperative scaling are equal to each other.

At step S1, the image signal generation unit 15 displays by default. In this embodiment, as shown in FIG. 3, the default state is the state in which a main display area 51 is displayed on the left of one display surface 16A of the display unit 16, and a sub display area 52 which has the same size as the main display area and is slightly separated therefrom, is displayed on the right. The image signals of two channels simultaneously received by the content acquisition unit 13 or reproduced by the recording unit 14 are the image signals of the main display area 51 and the sub display area 52. In the example of FIG. 3, images V1 and V2 are displayed in the main display area 51 and the sub display area 52, respectively.

When an instruction is issued, at step S2, the control unit 12 determines whether the cooperative scaling to enlarge the left screen is instructed. That is, when the user changes the ratio of the size of the screen of the left main display area 51 to the size of the screen of the right sub display area, the user operates the dedicated left button 22 or the right button 23 of the operation unit 21. When the size of the screen of the main display area 51 is enlarged, the left button 22 is operated, and when the size of the screen of the right sub display area is enlarged, the right button 23 is operated.

When the cooperative scaling to enlarge the left screen is instructed (that is, when the operation signal of the left button 22 is acquired by the operation signal acquisition unit 11), at step S3, the image signal generation unit 15 performs the process of enlarging the left screen and reducing the right screen in cooperation.

Figure 4:
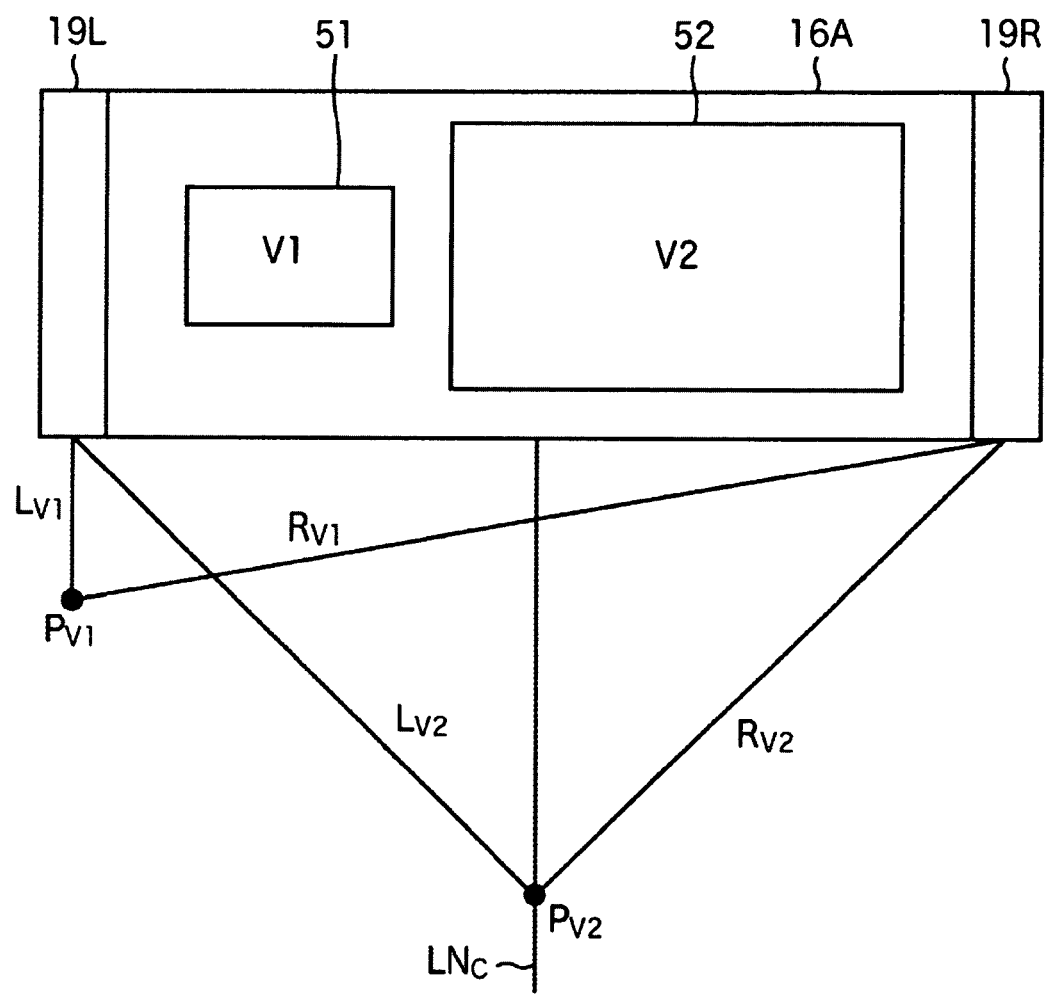
FIG. 4 is view showing a state of a case where the left screen at the cooperative scaling is small.

For example, as shown in FIG. 4, when the left button 23 is operated in the state where the size of the screen of the main display area 51 is small and the size of the screen of the sub display area 52 is large, the image signal generation unit 15 enlarges the size of the screen of the left main display area 51, and reduces the size of the screen of the right sub display area 52. As a result, as shown in FIG. 3, there occurs a state in which the size of the screen of the main display area 51 is equal to the size of the screen of the sub display area 52.

Figure 5:
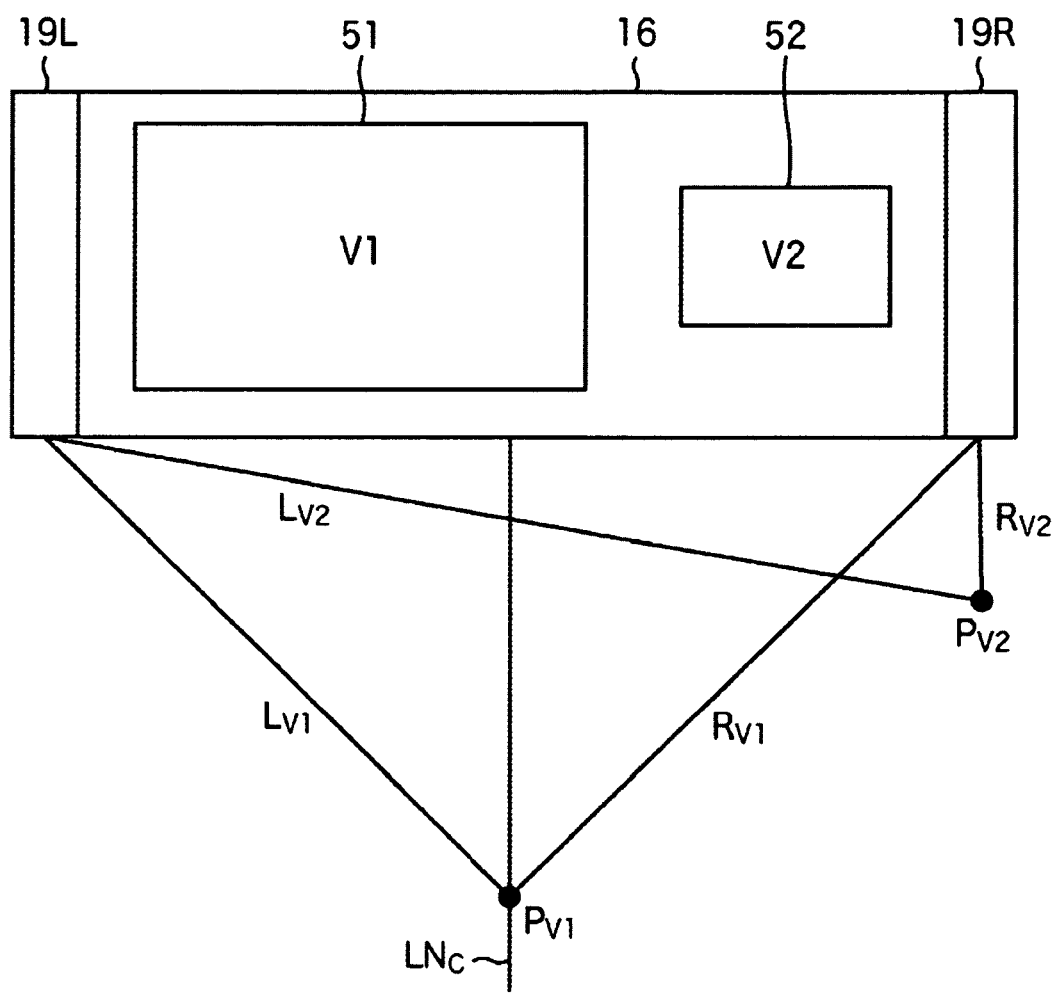
FIG. 5 is a view showing state of a case where the left screen at the cooperative scaling is large.

When the left button 22 is further operated, the image signal generation unit 15 further enlarges the size of the screen of the left main display area 51, and further reduces the size of the screen of the right sub display area 52. As a result, as shown in FIG. 5, the size of the screen of the main display area 51 becomes larger than the size of the screen of the sub display area 52. While the left button 22 is operated, the above operation is performed until the size of the screen of the main display area 51 becomes maximum (that is, the size of the screen of the sub display area 52 becomes minimum). As a result, the user can change the size of the screen of the main display area 51 to an arbitrary size by adjusting the operation time of the left button 22.

After the process of step S3, at step S5, the sound synthesizing unit 18 adjusts the sound along the cooperative characteristic. Specifically, as shown in FIG. 4, when the size of the screen of the main display area 51 is minimum and the size of the screen of the sub display area 52 is maximum, the volume localization calculation unit 17 calculates the phases of sound signals of sounds Lv2 and Rv2, so that the sounds Lv2 and Rv2 of the image V2 of the screen of the sub display area 52 maximum at that time are localized at a position Pv2 on a line LNc (as shown in FIG. 3, when the size of the screen of the main display area 51 is equal to the size of the screen of the sub display area 52, the line is spaced by an equal distance from the two screens) passing through the center of the display surface 16A. Based on the calculated values, the sound synthesizing unit 18 controls the phase of the sound signal of the sound Lv2 outputted from the sound output unit 19L positioned at the left end of the display surface 16A and the phase of the sound signal of the sound Rv2 outputted from the right sound output unit 19R.

Then, the volume localization calculation unit 17 calculates the phases for localizing the sound of the image V1 of the screen of the minimum main display area 51 at the leftmost position Pv1, and the sound synthesizing unit 18 controls the phase of a sound signal of a sound Lv1 outputted from the left sound output unit 19L and the phase of a sound signal of a sound Rv1 outputted from the right sound output unit 19R based on the calculated values.

Further, the volume localization calculation unit 17 calculates the sound signal levels of the sound Lv2 outputted from the left sound output unit 19L and the sound Rv2 outputted from the right sound output unit 19R, so that the volume of the sound of the image V2 of the screen of the maximum sub display area 52 is larger than the volume of the sound of the image V1 of the screen of the minimum main display area 51. The sound synthesizing unit 18 controls the levels of the sound signals based on the calculated values. The sound of the image V1 of the screen of the minimum main display area 51 can also be set substantially to the level of a mute state.

In the state where the size of the screen of the left main display area 51 becomes large and becomes equal to the size of the screen of the sub display area 52 as shown in FIG. 3, the sound synthesizing unit 18 controls the phase of the sound Lv1 outputted from the left sound output unit 19L and the phase of the sound Rv1 outputted from the right sound output unit 19R based on the calculation result of the volume localization calculation unit 17, so that the position Pv1 where the sound of the image V1 of the screen of the main display area 51 is localized becomes the position displaced to the left (direction toward the screen of the main display area 51) from the line LNc.

Besides, the sound synthesizing unit 18 controls the phase of the sound Lv2 outputted from the left sound output unit 19L and the phase of the sound Rv2 outputted from the right sound output unit 19R based on the calculation result of the volume localization calculation unit 17, so that the position Pv2 where the sound of the image V2 of the screen of the sub display area 52 is localized becomes the position displaced to the right (direction toward the screen of the sub display area 52) from the line LNc.

Then, the sound synthesizing unit 18 controls the sound signal levels of the sounds Lv1 and Lv2 outputted from the left sound output unit 19L and the sounds Rv1 and Rv2 outputted from the right sound output unit 19R based on the calculation result of the volume localization calculation unit 17, so that the volume of the sound of the image V1 of the screen of the main display area 51 is equal to the volume of the sound of the image V2 of the screen of the sub display area 52. However, this volume is made a value smaller than the volume of the sound of the image V2 of the screen of the maximum sub display area 52 of FIG. 4.

Accordingly, at the position in the vicinity of the line LNc, the user can quickly confirm both the sound of the image V1 of the screen of the main display area 51 and the sound of the image V2 of the screen of the sub display area 52 by concentrating on one of them or by merely slightly tilting the body to the left or the right without performing a special operation. Besides, since the user can hear the sound in stereo, the user can enjoy the sound with a sense of realism.

Further, in the state where the left main display area 51 becomes large and the size of the screen of the main display area 51 becomes maximum and the size of the screen of the sub display area 52 becomes minimum as shown in FIG. 5, the sound synthesizing unit 18 controls the phase of the sound Lv1 outputted from the left sound output unit 19L and the phase of the sound Rv1 outputted from the right sound output unit 19R, so that the sound of the image V1 of the screen of the main display area 51 maximum at that time is localized at the position Pv1 on the line LNc.

Then, the phase of the sound Lv2 outputted from the left sound output unit 19L and the phase of the sound Rv2 outputted from the right sound output unit 19R are controlled so that the sound of the image V2 of the screen of the sub display area 52 is localized at the rightmost position Pv2.

Further, the sound synthesizing unit 18 controls the sound signal levels of the sound Lv1 outputted from the left sound output unit 19L and the sound Rv1 outputted from the right sound output unit 19R, so that the volume of the sound of the image V1 of the screen of the main display area 51 becomes larger than the volume of the sound of the image V2 of the screen of the minimum sub display area 52. The sound of the image V2 of the screen of the minimum sub display area 52 can also be set substantially to the level of the mute state.

The volume at the position Pv2 of FIG. 4 is equal to the volume at the position Pv1 of FIG. 5, and the volume at the position Pv1 of FIG. 4 is equal to the volume at the position Pv2 of FIG. 5.

Figure 6:
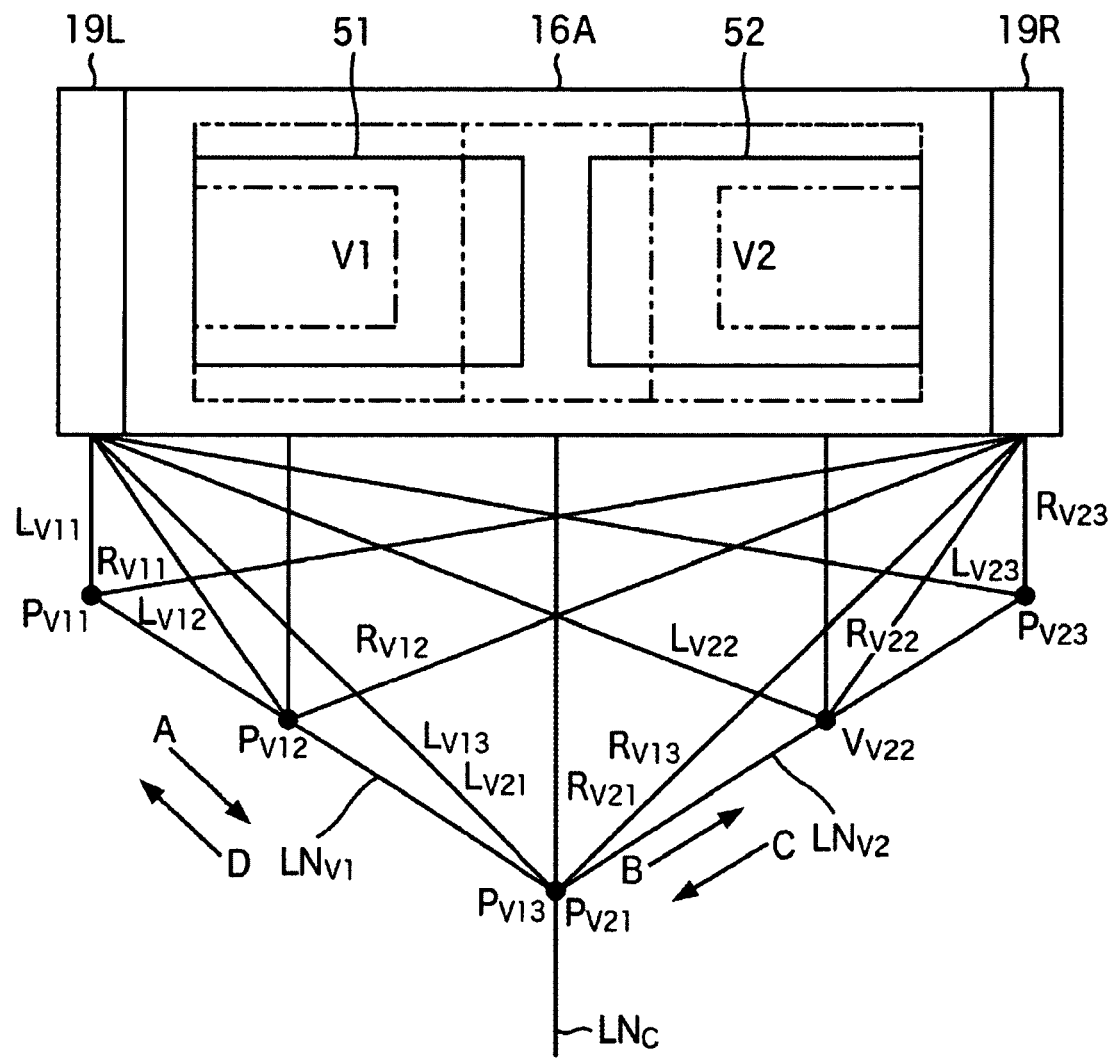
FIG. 6 is a view for explaining a cooperative characteristic.

FIG. 6 shows a state in which a position where a sound is localized is changed correspondingly to the cooperative scaling of two screens. When the size of the left main display area 51 becomes large, the position where the corresponding sound is localized is changed along a cooperative characteristic line LNv1 in a direction of an arrow A, that is, in a sequence of positions Pv11, Pv12 and Pv13. When the size of the right sub display area 52 becomes small in cooperation with this change, the position where the corresponding sound is localized is changed along a cooperative characteristic line LNv2 in a direction of an arrow B, that is, in a sequence of positions Pv21, Pv22 and Pv23.

Incidentally, when the localization position of the left main display area 51 is Pv11, the localization position of the corresponding right sub display area 52 is Pv21. When the localization position of the left main display area 51 is the position Pv12, the localization position of the corresponding right sub display area 52 is Pv22. When the localization position of the left main display area 51 is Pv13, the localization position of the corresponding right sub display area 52 is Pv23. The volume of the sound of a larger screen becomes larger, and its localization position becomes close to the line LNc.

The sound synthesizing unit 18 controls the phases and levels (directly the phases and levels of the sound signals) of the right and left corresponding sounds Rv11, Lv11, Lv12, Rv12, Lv13, Rv13, Lv21, Rv21, Lv22, Rv22, Lv23 and Rv23 based on the calculated values of the volume localization calculation unit 17, so that the localization position and the volume are adjusted.

At step S2, when it is determined that the cooperative scaling to enlarge the left screen is not instructed (that is, when it is determined that the cooperative scaling to enlarge the right screen is instructed), the process in the opposite direction to step S3 is performed.

That is, at step S4, the image signal generation unit 15 performs the process to enlarge the right screen and to reduce the left screen in cooperation. As shown in FIG. 5, when the right button 23 is operated in the state where the size of the screen of the sub display area 52 is small and the size of the screen of the main display area 51 is large, the image signal generation unit 15 enlarges the size of the screen of the right sub display area 52 and reduces the size of the screen of the left main display area 51. As a result, as shown in FIG. 3, there occurs the state where the size of the screen of the sub display area 52 is equal to the size of the main display area 51.

When the right button 23 is further operated, the image signal generation unit 15 further enlarges the size of the screen of the right sub display area 52 and further reduces the size of the screen of the left main display area 51. As a result, as shown in FIG. 4, the size of the screen of the sub display area 52 becomes larger than the size of the screen of the main display area 51. While the right button 23 is operated, the above operation is performed until the size of the screen of the sub display area 52 becomes maximum (until the size of the screen of the main display area 51 becomes minimum). As a result, the user can change the size of the screen of the sub display area 52 to an arbitrary size by adjusting the operation time of the right button 23.

After the process of step S4, at step S5, the sound synthesizing unit 18 adjusts the sound along the cooperative characteristic. The process in this case is substantially the same as that in the case performed after the process of step S3.

However, in this case, since the size of the screen of the right sub display area 52 is enlarged, in FIG. 6, the position where the corresponding sound is localized is changed along the characteristic line LNv2 in a direction of an arrow C, that is, in a sequence of the positions Pv23, Pv22 and Pv21. When the size of the left main display area 51 is reduced in cooperation with this change, the position where the corresponding sound is localized is changed along the characteristic line LNv1 in a direction of an arrow D, that is, in a sequence of the positions Pv13, Pv12 and Pv11.

After the process of step S5, at step S6, the control section 12 determines whether the end is instructed. When the end is not instructed, the process returns to step S2, and the subsequent process is repeated. When the end is instructed, the process is ended.

As described above, when one of the left button 22 and the right button 23 is operated, not only one of the left screen and the right screen is scaled, but also the other is also scaled in cooperation. Accordingly, not only the user can enjoy two pieces of content respectively displayed on the two screens simultaneously and in parallel, but also the user can selectively enjoy one piece of content at an arbitrary timing by a simple operation when necessary.

Besides, the sounds of the two pieces of content are localized at different positions. Accordingly, as compared with the case where two sounds are outputted monaurally, the user can easily and quickly identify the sounds as the contents of the content. Further, since each of the two sounds is stereo, the user can watch and hear the two pieces of content in a realistic state.

Further, in accordance with the screen cooperative scaling, the volume of the sound and the localization are also controlled in cooperation. Accordingly, the operationality is improved as compared with the case where the operation of scaling of the screen size and the operation of sound control are made independent operations.

The sound is adjusted in cooperation with the scaling of the screen, so that the volume of a larger screen becomes larger and the localization thereof becomes close to the center line LNc. Accordingly, between two pieces of content watched and heard simultaneously, the user can watch and hear the contents of a more noted one easily, quickly and selectively.

When one of the screens becomes maximum, the sound of the maximum screen is localized at the center. As a result, the user pays attention to one of the two pieces of content and can easily watch and hear the content by merely adjusting the scaling of the two screens suitably.

In the first embodiment, each of different images (of course, the images may be the same) is displayed on each of the two screens. In a second embodiment, a screen of a sub display area 52 between two screens is divided, and one image is displayed in each of the divided areas, so that plural images are displayed on the screen of the one sub display area 52. One image selected from the divided areas is displayed in the other main display area 51 between the two screens.

Figure 7:
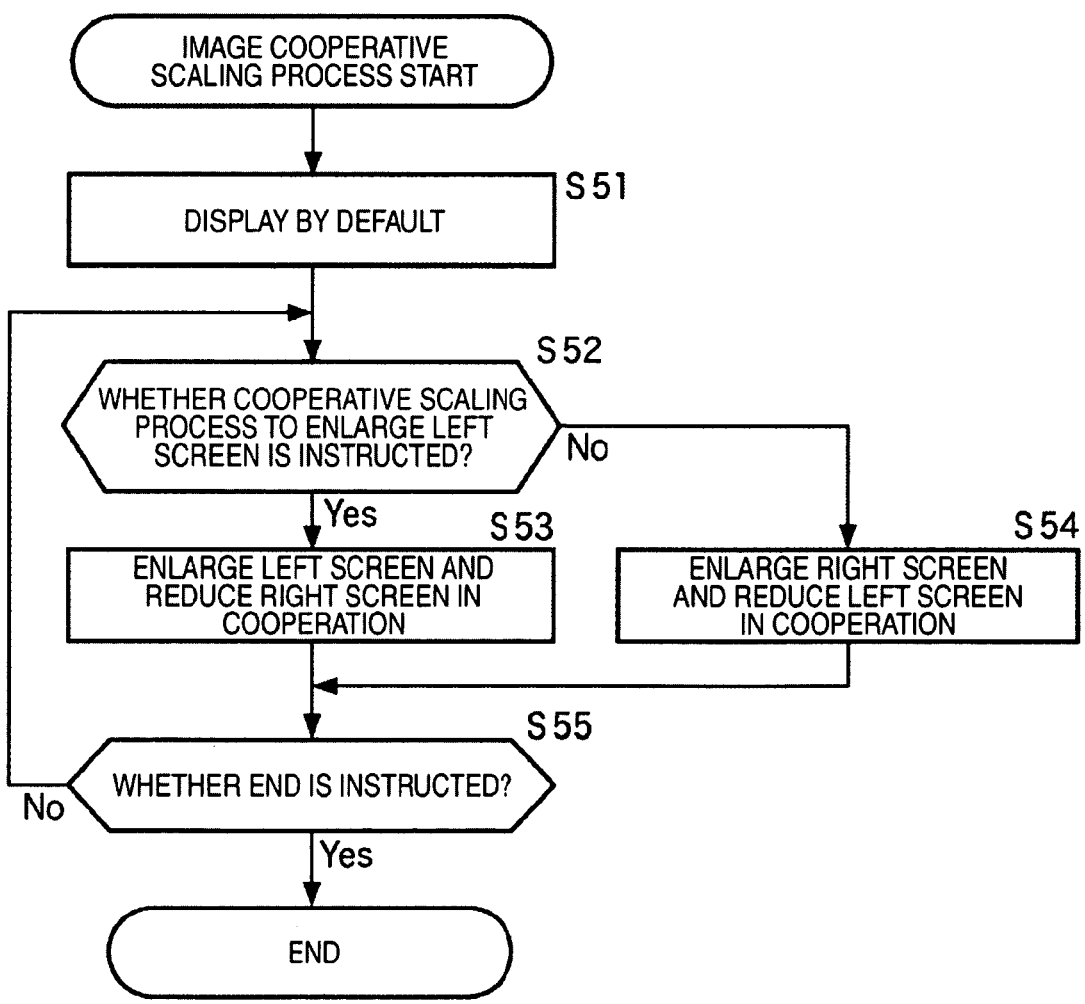
FIG. 7 is a flowchart for explaining an image cooperative scaling process.

In the second embodiment, an image cooperative scaling process is performed as shown in FIG. 7. This process is the same as the process of steps S1 to S4 and S6 of FIG. 2, and is started when an image display is instructed.

Figure 8:
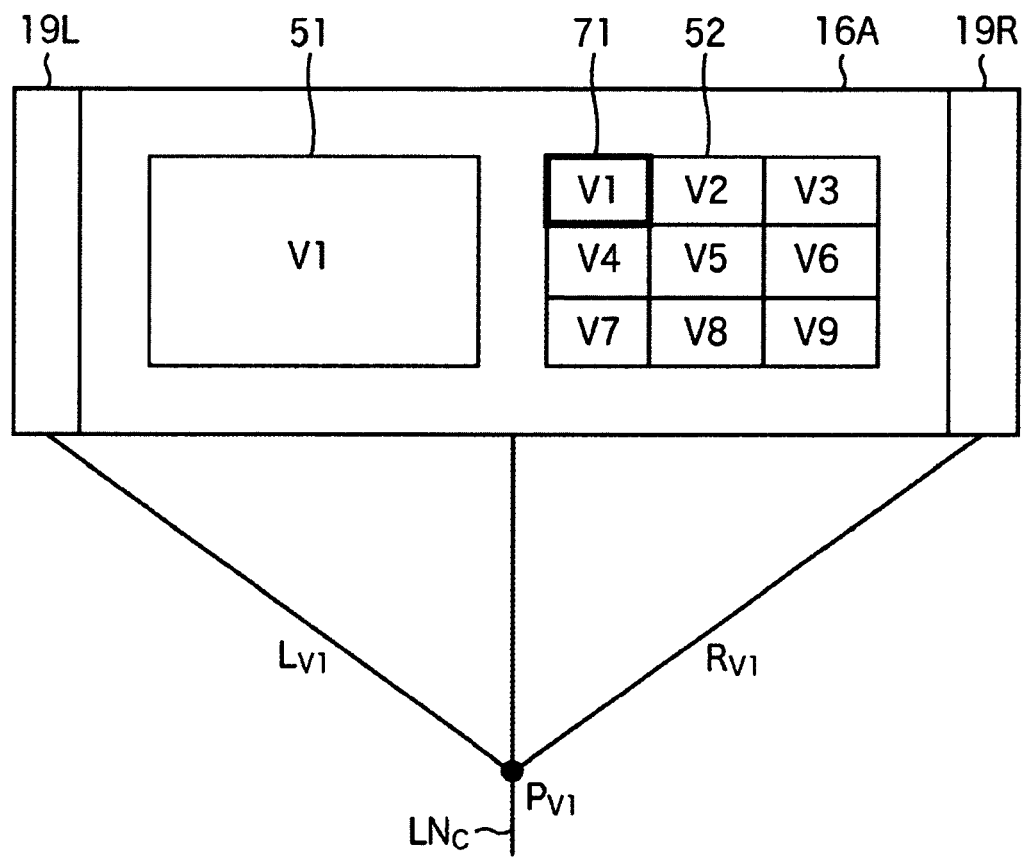
FIG. 8 is a view showing a state where sizes of right and left screens at cooperative scaling are equal to each other.

At step S51, the control unit 12 produces a default display. In this embodiment, as shown in FIG. 8, the default state is the state in which the left main display area 51 and the right sub display area 52 are displayed in the same size.

The sub display area 52 is divided into nine areas, and image signals of nine channels simultaneously received by the content acquisition unit 13 or reproduced by the recording unit 14 are image signals of the respective division areas of the sub display area 52. The nine image signals are scaled by the image signal generation unit 15 so that nine thumbnail images of moving images (denoted by V1 to V9 in FIG. 8) can be displayed.

An image of an area selected and decided from the nine thumbnail images displayed in the nine divided areas of the sub display area 52 is displayed in the main display area 51. In the default state, as shown in FIG. 8, the upper left area of the sub display area 52 is selected and decided by a cursor 71, and the same image V1 as the area is displayed in the main display area 51. An image of an area selected just before the power of the image processing apparatus 1 is turned off may be displayed in the main display area 51.

When the user operates the movement button 24, the image signal generation unit 51 moves the cursor 71 in the direction of the operation. When the user operates the decision button 25, the image signal generation unit 15 decides the selection of the image signal of the area of the sub display area 52 selected by the cursor 71 at that time, and displays it as the image of the main display area 51.

In the way as stated above, the user can simultaneously and in parallel confirm the nine pieces of content displayed in the sub display area 52, while watching and hearing the content of the main display area 51. By this, as compared with a case where only one screen is displayed on the display surface 16A and zapping is performed by switching the image displayed on the screen, the other content can be confirmed without missing watching the contents of content noticed at that time.

Further, by selecting one of the nine pieces of content by the cursor 71 when necessary, the contents of the selected content can be confirmed in more detail based on the sound. Incidentally, this point will be described later with reference to FIG. 11.

When an instruction is issued, at step S52, the control unit 12 determines whether cooperative scaling to enlarge the left screen is instructed. When the cooperative scaling to enlarge the left screen is instructed (when the operation signal of the left button 22 is acquired by the operation signal acquisition unit 11), at step S53, a process to enlarge the left screen and to reduce the right screen in cooperation is performed.

Figure 9:
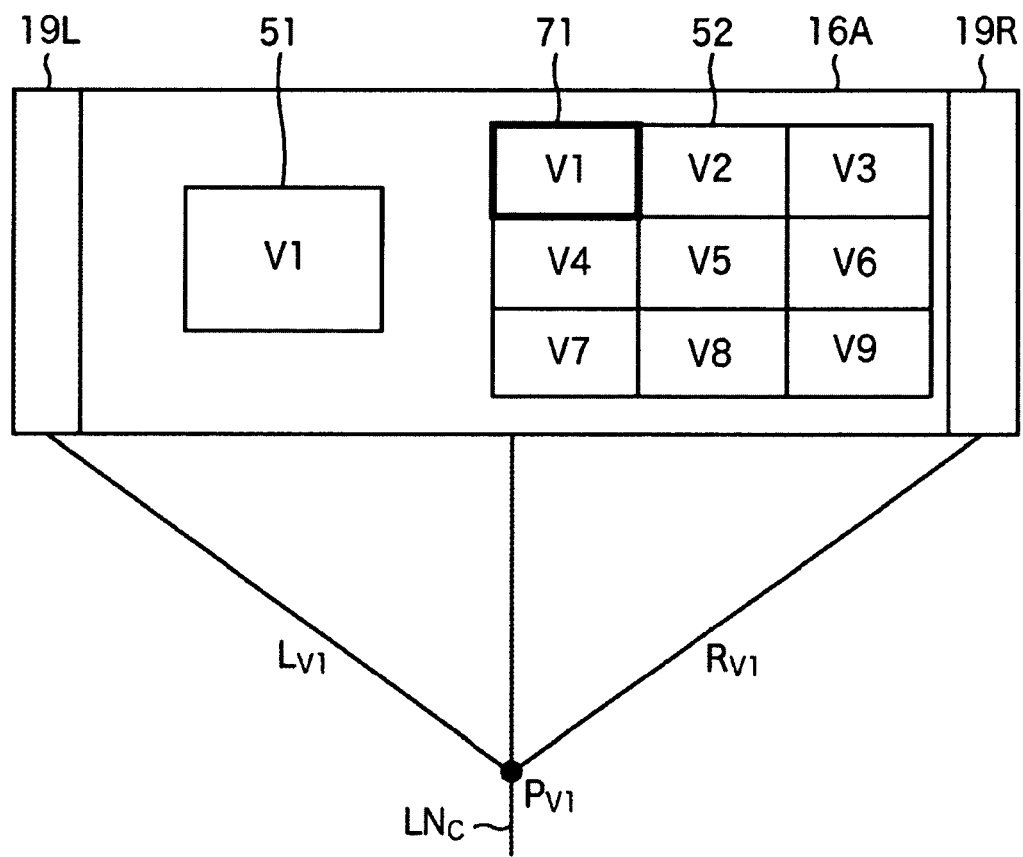
FIG. 9 is a view showing a state of a case where the left screen at the cooperative scaling is small.

For example, as shown in FIG. 9, when the left button 22 is operated in the state where the size of the screen of the main display area 51 is small and the size of the screen of the sub display area 52 is large, the image signal generation unit 15 enlarges the size of the screen of the left main display area 51, and reduces the size of the screen of the right sub display area 52. As a result, as shown in FIG. 8, there gradually occurs a state where the size of the screen of the main display area 51 is equal to the size of the screen of the sub display area 52.

Figure 10:
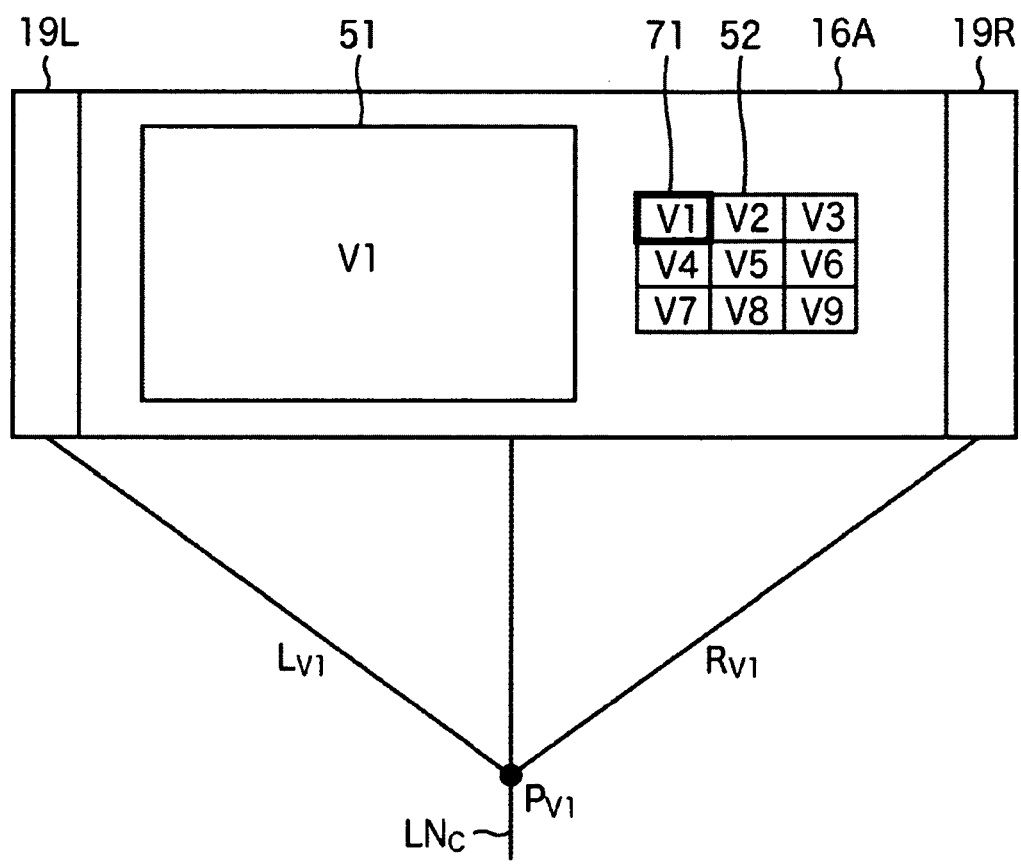
FIG. 10 is a view showing a state of a case where the left screen at the cooperative scaling is large.

When the left button 22 is further operated, the image signal generation unit 15 further enlarges the size of the screen of the left main display area 51, and further reduces the size of the screen of the right sub display area 52. As a result, as shown in FIG. 10, the size of the screen of the main display area 51 becomes larger than the size of the screen of the sub display area 52. While the left button 22 is operated, the operation is performed until the size of the screen of the main display area 51 becomes maximum (until the size of the screen of the sub display area 52 becomes minimum). As a result, the user can change the size of the screen of the main display area 51 to an arbitrary size by adjusting the operation time of the left button 22.

At step S52, when it is determined that cooperative scaling to enlarge the left screen is not instructed (when it is determined that cooperative scaling to enlarge the right screen is instructed), a process in the opposite direction to step S53 is performed at step S54.

That is, at step S54, the control section 12 performs a process to enlarge the right screen and to reduce the left screen in cooperation. As shown in FIG. 10, when the right button 23 is operated in the state where the screen of the sub display area 52 is small and the size of the screen of the main display area 51 is large, the image signal generation unit 15 enlarges the size of the screen of the right sub display area 52 and reduces the size of the screen of the left main display area 51. As a result, as shown in FIG. 8, there gradually occurs a state where the size of the screen of the sub display area 52 is equal to the size of the screen of the main display area 51.

When the right button 23 is further operated, the image signal generation unit 15 further enlarges the size of the screen of the right sub display area 52, and further reduces the size of the screen of the left main display area 51. As a result, as shown in FIG. 9, the size of the screen of the sub display area 52 becomes larger than the size of the screen of the main display area 51. While the right button 23 is operated, the operation is performed until the size of the screen of the sub display area 52 becomes maximum (the size of the screen of the main display area 51 becomes minimum). As a result, the user can change the size of the screen of the sub display area 52 to an arbitrary size by adjusting the operation time of the right button 23.

After the process of steps S53 and S54, at step S55, the control unit 12 determines whether the end is instructed. When the end is not instructed, the process is returned to step S52, and the subsequent process is repeated. When the end is instructed, the process is ended.

As described above, in accordance with the user's operation of one of the left button 22 and the right button 23, the size of the screen of the main display area 51 and the size of the screen of the sub display area 52 are scaled in cooperation, which is the same as the case of the first embodiment.

Figure 11:
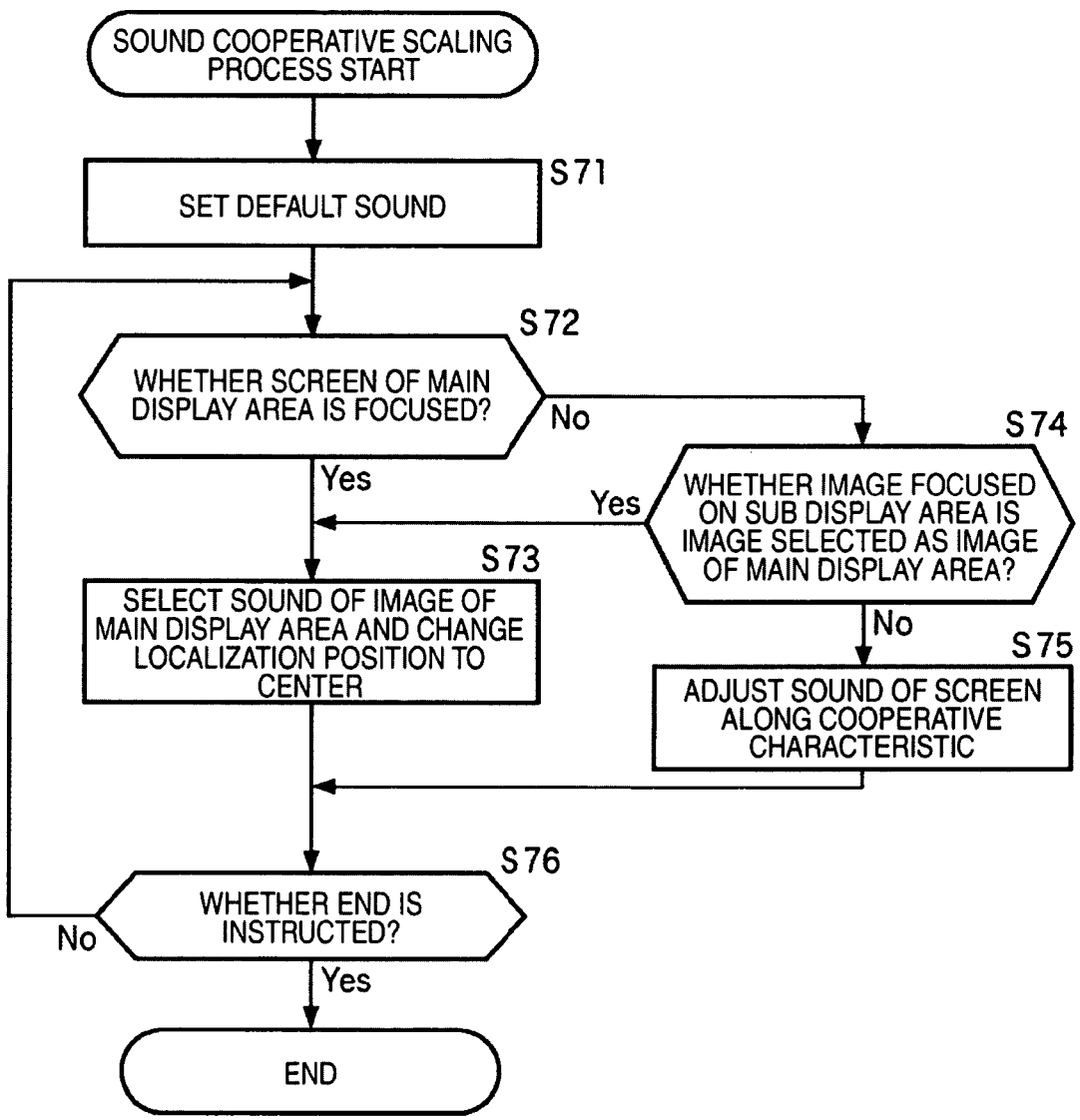
FIG. 11 is a flowchart for explaining a sound cooperative scaling process.

A sound cooperative scaling process shown in a flowchart of FIG. 11 is further performed in cooperation with the image cooperative scaling process of FIG. 7 as stated above.

At step S71, the control unit 12 sets a default sound. As described above, in the case of this embodiment, the state shown in FIG. 8 is the default state. In this case, the upper left area of the sub display area 52 is selected by the cursor 71, and the image of the upper left area is displayed on the screen of the main display area 51. Thus, the image which the user tries to watch and hear is the image V1. Then, the sound synthesizing unit 18 controls the sound signal phases of sound Lv1 outputted from the left sound output unit 19L and sound Rv1 outputted from the right sound output unit 19R based on the calculated value of the sound localization calculation unit 17, so that the localization position becomes position Pv1 on the line LNc.

At step S72, the control unit 12 determines whether the screen of the main display area is focused. In the case of this embodiment, it is determined that a screen on which the cursor 71 is positioned is focused. In the case shown in FIG. 8, since the cursor 71 is positioned on the upper left area of the sub display area 52, it is determined that the sub display area 52, not the main display area 51, is focused.

In this case, at step S74, the control unit 12 determines whether the image focused on the sub display area is the image selected as the image of the main display area. In the case shown in FIG. 8, the image V1 selected by the cursor 71 is displayed as the image V1 in the main display area 51. Then, in such a case, at step S73, the sound synthesizing unit 18 selects the sound of the image of the main display area based on the calculated value of the sound localization calculation unit 17, and sets the localization position at the center. That is, as shown in FIG. 8, the sound of the image V1 of the main display area 51 is selected, the phase is controlled so that the sound is localized at the position Pv1 on the line LNc, the sound Lv1 is outputted from the left sound output unit 19L, and the sound Rv1 is outputted from the right sound output unit 19R.

Also in the case shown in FIG. 9 and FIG. 10, the image V1 of the upper left area of the sub display area 52 is selected by the cursor 71, and is displayed as the image V1 in the main display area 51. Accordingly, also in these cases, the sounds Lv1 and Rv1 of the image V1 of the main display area 51 are outputted to be localized at the position Pv1 on the line LNc.

As stated above, when the content selected by the cursor 71 in the sub display area 52 is equal to the content displayed in the main display area 51, the user pays attention to the selected content (that is, the content displayed in the main display area 51). Then, in this case, the sound of only the content displayed in the main display area 51 is outputted, so that it is prevented that an unnecessary, sound is provided to the user.

Figure 12:
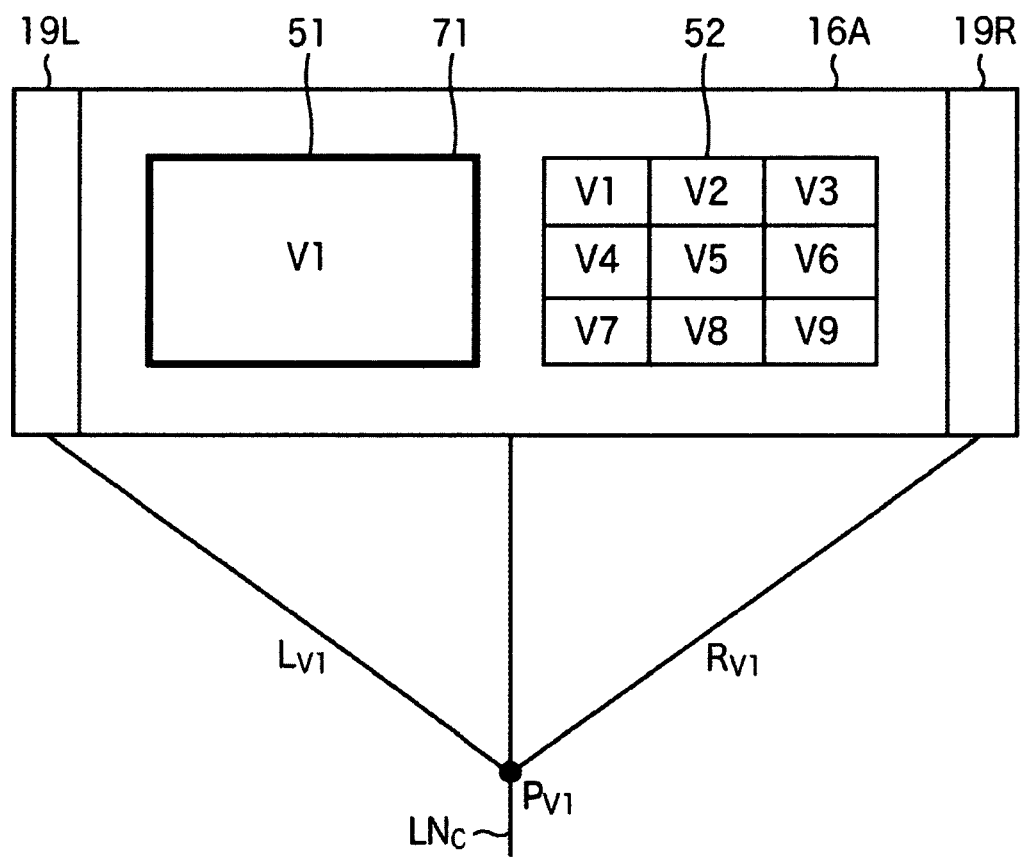
FIG. 12 is a view showing a state where sizes of right and left screens at cooperative scaling are equal to each other.
Figure 13:
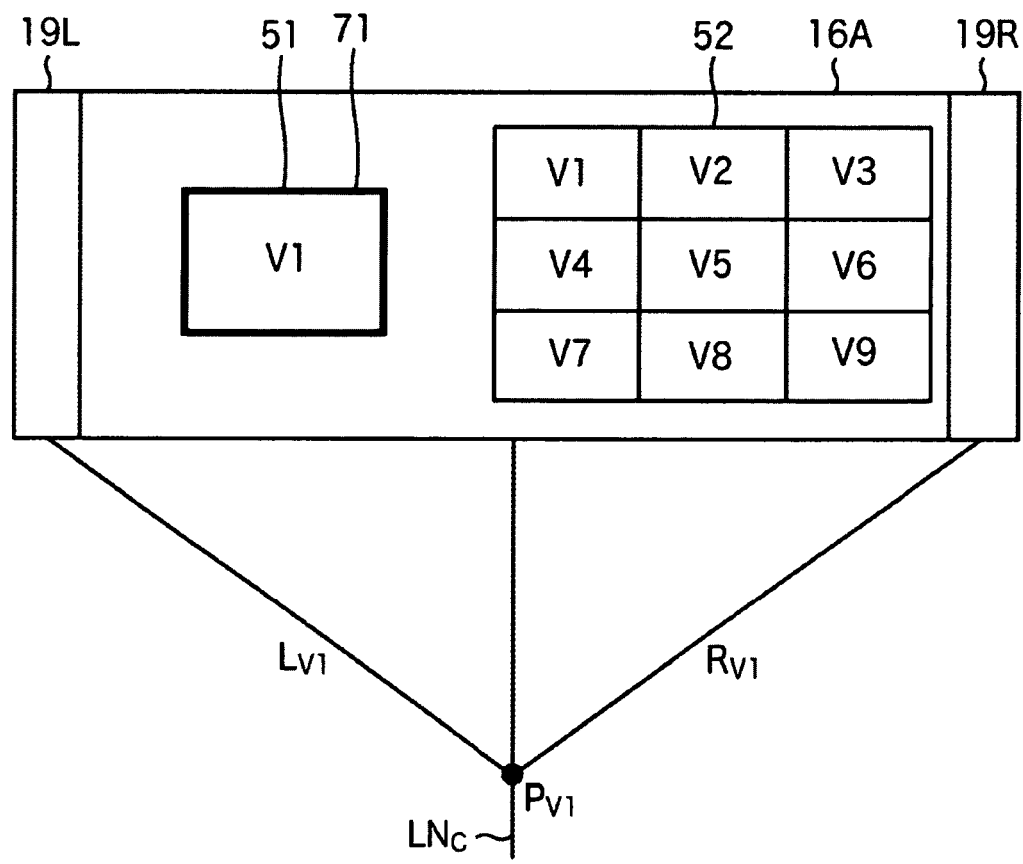
FIG. 13 is a view showing a state of a case where the left screen at the cooperative scaling is small.
Figure 14:
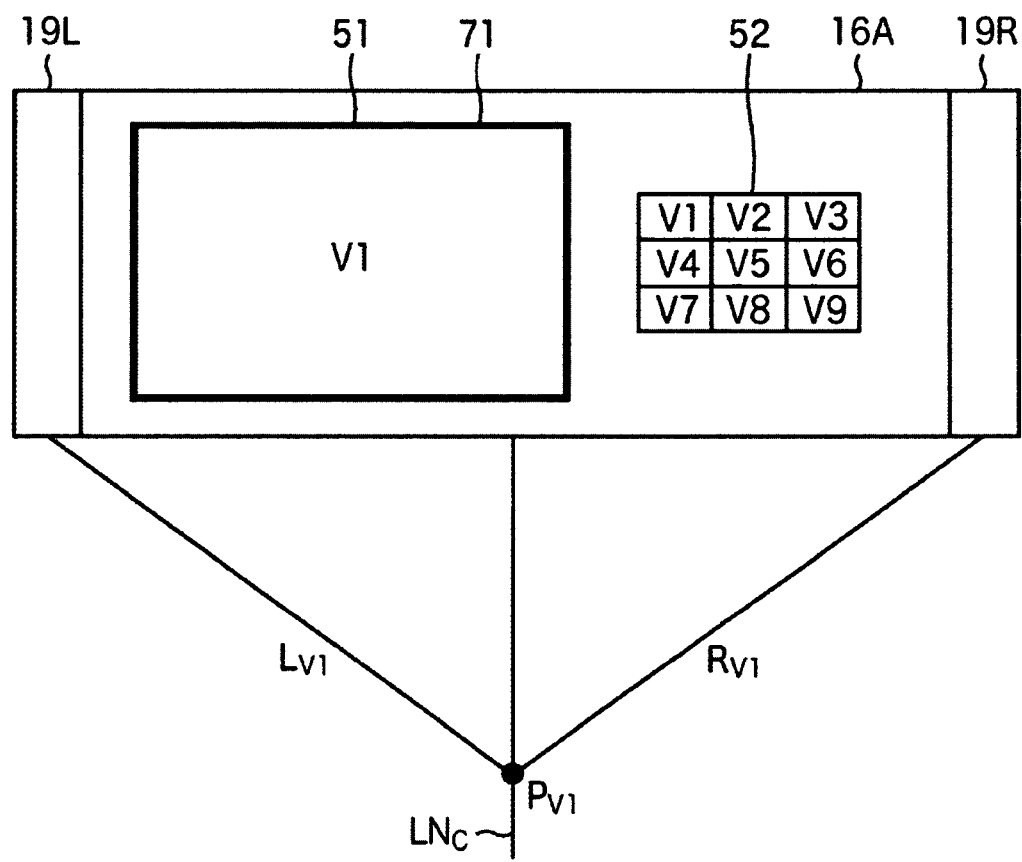
FIG. 14 is a view showing a state of a case where the left screen at the cooperative scaling is large.

Also in the case where it is determined at step S72 that the focused screen is the screen of the main display area 51, the process of step S73 is performed. Accordingly, for example, as shown in FIG. 12, in the state where the screen size of the main display area 51 is equal to that of the sub display area 52, and the image V1 of the main display area 51 is focused by the cursor 71, when the screen of the main display area 51 is reduced as shown in FIG. 13, or also when the screen of the main display area 51 is enlarged as shown in FIG. 14, the sounds Lv1 and Rv1 of the image V1 of the main display area 51 are outputted to be localized at the position Pv1 on the line LNc.

As stated above, also in the case where the main display area 51 is selected by the cursor 71, the user pays attention to the content of the main display area 51. Then, in this case, the sound of only the content displayed in the main display area 51 is outputted, so that it is prevented that an unnecessary sound is provided to the user.

At step S74, when it is determined that an image focused in the sub display area 52 is not the image selected as the image of the main display area 51, at step S75, the sound synthesizing unit 18 adjusts the sound along a cooperative characteristic. That is, a process similar to step S5 of FIG. 2 is performed.

Figure 15:
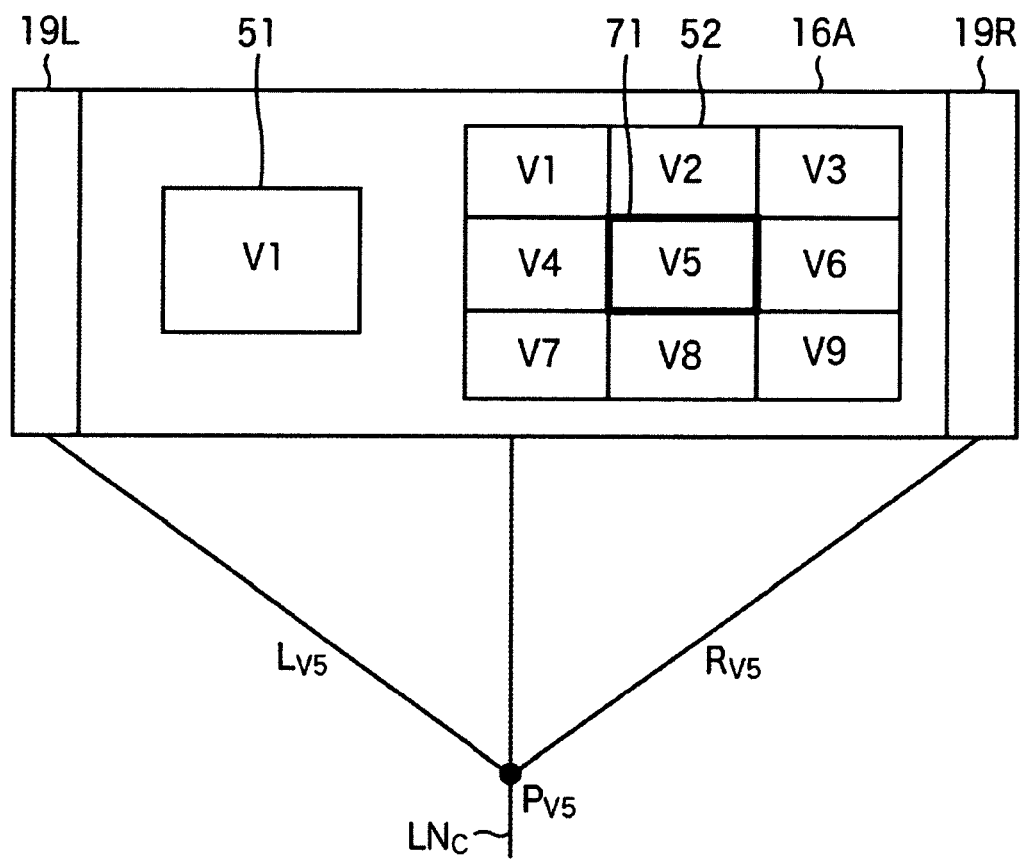
FIG. 15 is a view showing a state of a case where the left screen at the cooperative scaling is small.

For example, in the case shown in FIG. 15, a center area in which an image V5 is displayed is focused by the cursor 71 in the sub display area 52, and the upper left area in which the image V1 displayed in the main display area 51 is displayed is not focused. In the case of FIG. 15, the screen of the main display area 51 is minimum, and the screen of the sub display area 52 is maximum. Thus, the sound of the image V5 of the focused area of the sub display area 52, where the cursor is actually positioned, is selected. The phases are controlled so that sound Lv5 from the left sound output unit 19L and sound Rv5 from the right sound output unit 19R are localized on the line LNc. The sound of the image V1 is substantially muted and is not outputted.

Figure 16:
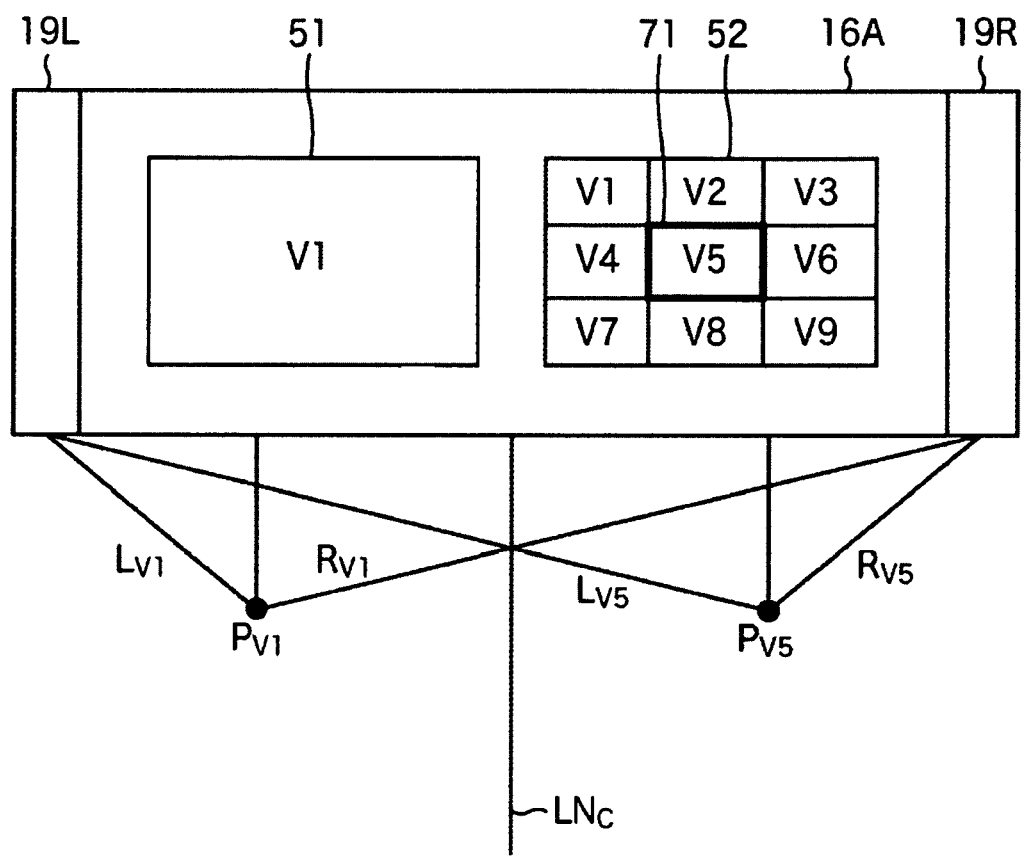
FIG. 16 is a view showing a state where sizes of right and left screens at the cooperative scaling are equal to each other.

When the screen of the left main display area 51 is enlarged from the state of FIG. 15 and is made to have the same size as the screen of the sub display area 52 as shown in FIG. 16, the phases of the sounds Lv1 and Rv1 of the image V1 of the screen of the main display area 51 are controlled, so that the sounds are localized at position Pv1 on the main display area 51 side with respect to the line LNc. Similarly, the phases of the sounds Lv5 and Rv5 of the image V5 of the screen of the sub display area 52 are controlled, so that the sounds are localized at position Pv5 on the sub display area 52 side with respect to the line LNc.

Figure 17:
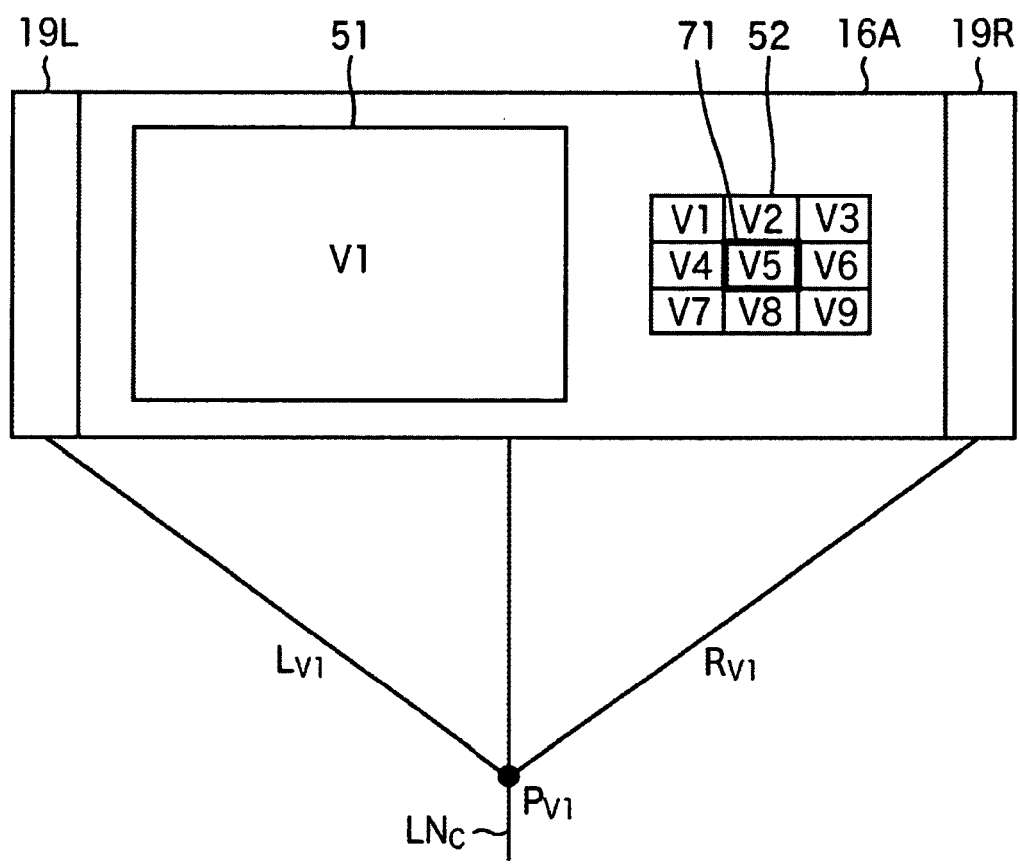
FIG. 17 is a view showing a state of a case where the left screen at the cooperative scaling is large.

When the screen of the left main display area 51 is further enlarged from the state of FIG. 16 and is made to have the maximum size as shown in FIG. 17, the phases of the sounds Lv1 and Rv1 of the image V1 of the screen of the main display area 51 are controlled, so that the sounds are localized at the position Pv1 on the line LNc. The sound of the image V5 is substantially muted and is not outputted.

When an image of content of an area different from the content of the screen of the main display area 51 is focused in the sub display area 52, it is conceivable that the user is searching content to be seen in the sub display area 52. Then, in this case, similarly to the case shown in FIG. 6, the sound is adjusted along the cooperative characteristic lines LNv1 and LNv2. That is, the sound is adjusted similarly to the case where the content selected by the cursor 71 is displayed in the sub display area 52 of the first embodiment shown in FIG. 2 to FIG. 6.

By this, also in the process of step 75, an effect similar to the case of the first embodiment can be obtained.

That is, when one of the left button 22 and the right button 23 is operated, not only one of the left screen and the right screen is scaled, but also the other is scaled in cooperation. Accordingly, while confirming the content displayed in the main display area 51, the user can easily search arbitrary content in parallel from the screen of the sub display area 52.

Besides, the sounds of two pieces of content are respectively localized at different positions. Accordingly, as compared with the case where two sounds are outputted monaurally, the user can easily and quickly identify the sound as the contents of the content. Further, since each of the two sounds is stereo, the user can search arbitrary content in a realistic state, and accordingly, more specifically.

Further, in accordance with the cooperative scaling of the screens, the volume of the sound and the localization are also control in cooperation. Accordingly, the operationality is improved as compared with the case where the operation of scaling of the size of the screen and the operation of control of the sound are independent of each other.

The sound is adjusted in cooperation with the scaling of the screens, so that the volume of a larger screen is larger and is localized at a position closer to the center line LNc. Accordingly, the user can easily, quickly and selectively watch and hear the contents of simultaneously searched content.

When one of the screens becomes maximum, the sound of the maximum screen is localized at the center. As a result, the user pays attention to one of two pieces of content and can easily watch and hear it by merely adjusting the scaling of the two screens suitably.

Figure 18:
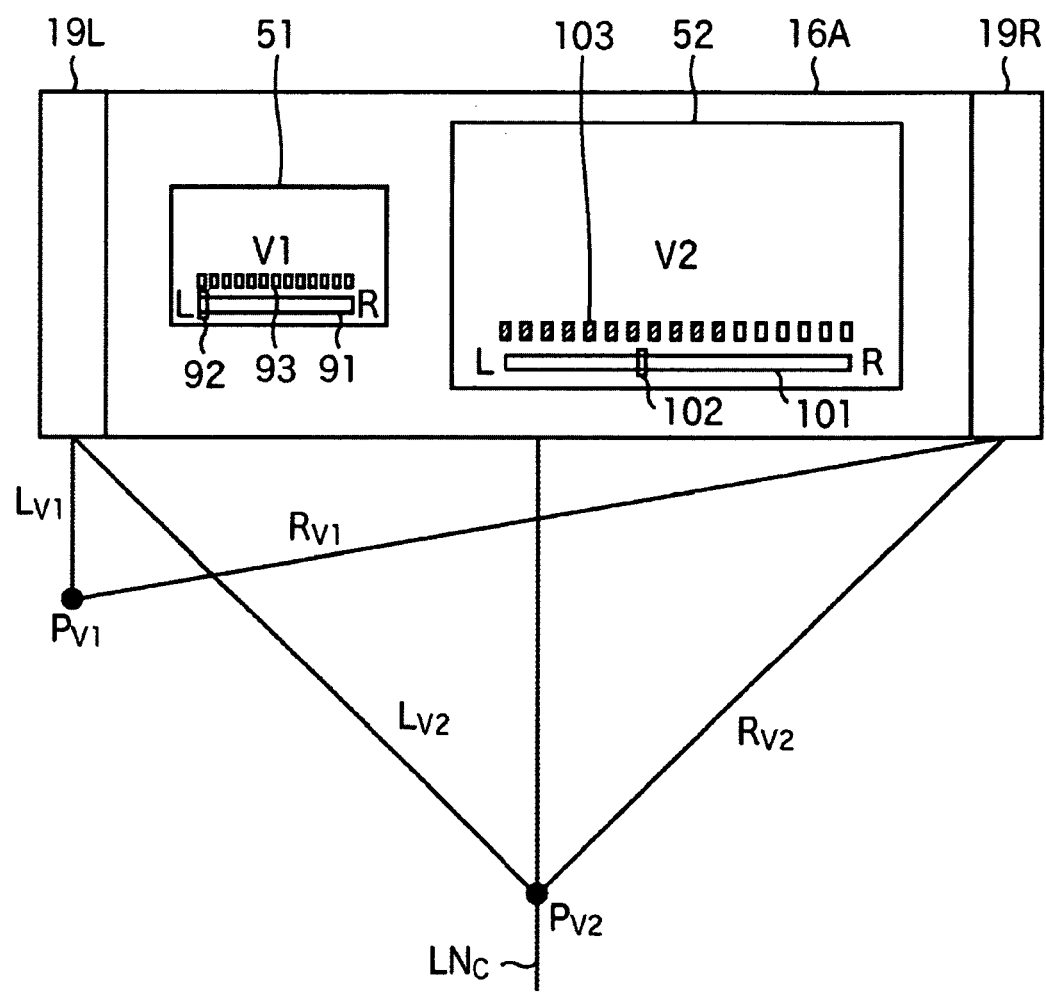
FIG. 18 is a view showing the display of a localized position and volume.
Figure 19:
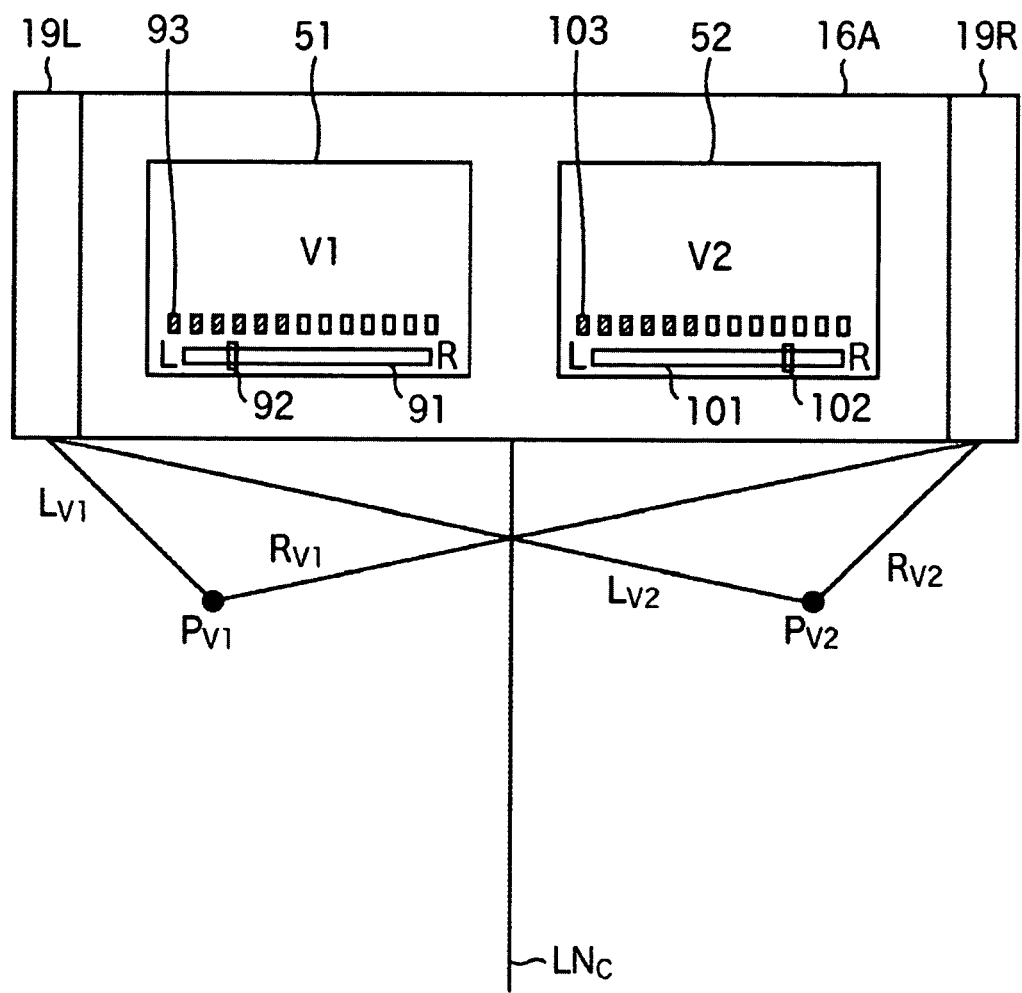
FIG. 19 is a view showing the display of the localized position and volume.
Figure 20:
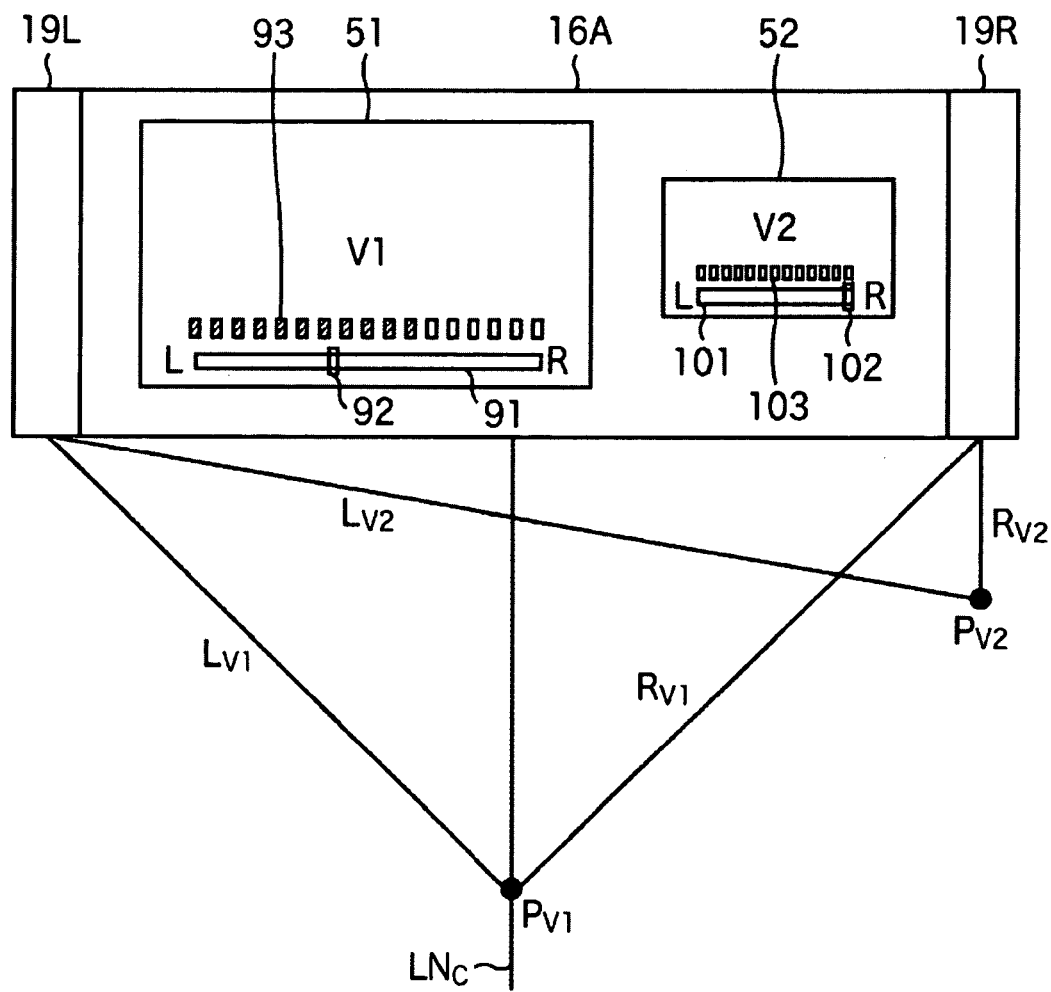
FIG. 20 is a view showing the display of the localized position and volume.

FIG. 18 to FIG. 20 show a display example of a third embodiment in which a position where sounds are localized and volume are displayed on a screen. As shown in these drawings, on the screens of a main display area 51 and a sub display area 52, positions where sounds of respective displayed images are localized are indicated by movement portions 92 and 102 on bars 91 and 101. The positions of the movement portions 92 and 102, on the bars 91 and 101 are moved according to the positions where the screen sounds of the main display area 51 and the sub display area 52 are localized. The image signal generation unit 15 controls these displays according to the localization position and the value of the volume calculated by the volume localization calculation unit 17.

In FIG. 18, since the sound of the image V1 of the screen of the main display area 51 is localized at the left position Pv1, the movement portion 92 is displayed at the left end of the bar 91. Since the sound of the image V2 of the screen of the sub display area 52 is localized at the position PV2 on the line LNc, the movement portion 102 is displayed at the center of the bar 101 indicating the position where the sound of the sub display area 52 is localized.

In FIG. 19, since the sound of the image V1 of the screen of the main display area 51 is localized at the position Pv1 closer to the center than the left end and on the left side of the line LNc, the movement portion 92 is displayed between the left end and the center of the bar 91. Since the sound of the image V2 of the screen of the sub display area 52 is localized at position Pv2 closer to the center than the right end and on the right side of the line LNc, the movement portion 102 is displayed between the right end and the center of the bar 101.

In FIG. 20, since the sound of the image V1 of the screen of the main display area 51 is localized at the position PV1 on the line LNc, the movement portion 92 is displayed at the center of the bar 91 indicating the position where the sound of the screen of the main display area 51 is localized. Since the sound of the image V2 of the screen of the sub display area 52 is localized at the position Pv2 of the right end, the movement portion 102 is displayed at the right end of the bar 101.

Further, in FIG. 18 to FIG. 20, in the main display area 51, a bar 93 to indicate the volume of the sound of the screen is displayed. In the bar 93, the volume of the corresponding sound is indicated by the number of lighted blocks. Similarly, in the sub display area 52, a bar 103 indicating the volume of the sound of the screen is displayed. Also in the bar 103, the volume of the corresponding sound is indicated by the number of lighted blocks.

As stated above, in the example of FIG. 18 to FIG. 20, since the position where the sound is localized and the volume are displayed, the user can certainly recognize the localization position and the volume.

Although not shown, also in the case shown in FIG. 8 to FIG. 10 and FIG. 12 to FIG. 17, the position where the sound is localized and the volume can be similarly displayed.

Incidentally, in the above, although the number of screens is two, the invention can be applied to the case where the number is three or more.

Besides, although plural screens are displayed on the one display surface 16A, the invention can be applied also to a case where separate display units respectively displaying screens are collectively arranged side by side in the right and left direction, and the sound output units 19L and 19R are disposed at the right and left ends of the plural display units.

The foregoing series of processes can be executed by hardware, or can also be executed by software. When the series of processes are executed by software, a program constituting the software is assembled in the dedicated hardware of a computer, or is installed from a program recording medium into a general-purpose personal computer which can execute various functions by installing various programs.

The program recording medium to store the program which is installed in the computer and is put in an executable state by the computer is a removable medium as a package medium, such as a magnetic disk (including a flexible disk), an optical disk (including a CD-ROM (Compact Disc-Read Only Memory), a DVD (Digital Versatile Disk), or a magneto-optical disk), or a semiconductor memory, or a ROM in which the program is temporarily or permanently stored, or a hard disk. The storage of the program into the program storage medium is performed using a wired or wireless communication medium, such as local area network, Internet or digital satellite broadcast, through an interface such as a router or a modem as required.

Incidentally, in the present specification, steps describing the program include processes performed in time series along the recited order, and processes which are not necessarily performed in time series but are performed in parallel or individually.

Besides, the embodiments of the present invention are not limited to the foregoing embodiments, and various modifications can be made within the scope not departing from the gist of the invention.

What is claimed is:

1. An image processing apparatus comprising:
   a generating unit configured to generate a plurality of image signals for displaying content on each of a plurality of screens of a display surface;
   and a synthesizing unit configured to synthesize a plurality of sound signals corresponding to the plurality of image signals to cause positions where sounds based on the plurality of sound signals are localized to vary from each other by adjusting a level and a phase of each of the plurality of sound signals,
   wherein the localized positions are changed in accordance with cooperative scaling of a first screen and a second screen, and wherein cooperative scaling includes enlarging a size of one of the first screen and the second screen and reducing a size of the other of the first screen and the second screen in cooperation with the enlarging, and
   wherein when the first screen and the second screen are different in size, a sound of a larger one of the screens is localized at a position further from the first screen and the second screen.

2. The image processing apparatus according to claim 1, wherein when a first screen and a second screen of the plurality of screens are displayed in equal sizes, a first position where a sound based on a first sound signal corresponding to the first screen is localized and a second position where a sound based on a second sound signal corresponding to the second screen is localized are respectively displaced in a direction toward the first screen and a direction toward the second screen with reference to a line spaced by an equal distance from the first screen and the second screen.

3. The image processing apparatus according to claim 2, wherein when the first screen and the second screen are different in size, a sound of a larger one of the screens is localized at a position closer to the line.

4. The image processing apparatus according to claim 3, wherein when one of the first screen and the second screen becomes maximum in size, the sound of the maximum screen is localized on the line.

5. The image processing apparatus according to claim 2, wherein when the first screen displays an image corresponding to a thumbnail image selected from a plurality of thumbnail images displayed on the second screen, when the thumbnail image corresponding to the image of the first screen is focused on the second screen, the sound of the first screen is localized on the line, and when the thumbnail image different from the image of the first screen is focused on the second screen, the localized position is changed in accordance with the cooperative scaling of the first screen and the second screen.

6. The image processing apparatus according to claim 2, wherein when the first screen displays an image corresponding to a thumbnail image selected from a plurality of thumbnail images displayed on the second screen, and when the image of the first screen is focused, the sound of the first screen is localized on the line.

7. The image processing apparatus according to claim 2, wherein the position where the sound of each of the first screen and the second screen is localized is displayed.

8. The image processing apparatus according to claim 2, wherein volume of the sound of each of the first screen and the second screen is displayed.

9. The image processing apparatus of claim 1, wherein the first screen and the second screen do not overlap on the display surface.

10. An image processing method of an image processing apparatus, the method comprising the steps of:

generating image signals for displaying content on each of a plurality of screens of a display surface;

and synthesizing a plurality of sound signals corresponding to the plurality of image signals to cause positions where sounds based on the plurality of sound signals are localized to vary from each other by adjusting a level and a phase of each of the plurality of sound signals, wherein the localized positions are changed in accordance with cooperative scaling of a first screen and a second screen, and wherein cooperative scaling includes enlarging a size of one of the first screen and the second screen and reducing a size of the other of the first screen and the second screen in cooperation with the enlarging, and wherein when the first screen and the second screen are different in size, a sound of a larger one of the screens is localized at a position further from the first screen and the second screen.

11. A non transitory computer-readable recording medium recorded with a program for causing a computer to execute the processes of:

generating image signals for displaying content on each of a plurality of screens of a display surface;

and synthesizing a plurality of sound signals corresponding to the plurality of image signals to cause positions where sounds based on the plurality of sound signals are localized to vary from each other by adjusting a level and a phase of each of the plurality of sound signals, wherein the localized positions are changed in accordance with cooperative scaling of a first screen and a second screen, and wherein cooperative scaling includes enlarging a size of one of the first screen and the second screen and reducing a size of the other of the first screen and the second screen in cooperation with the enlarging, and wherein when the first screen and the second screen are different in size, a sound of a larger one of the screens is localized at a position further from the first screen and the second screen.

* * * * *